United States Patent
Welker et al.

(10) Patent No.: US 8,483,422 B2
(45) Date of Patent: Jul. 9, 2013

(54) ENCLOSURE FOR A SPEAKER OF A WIRELESS DEVICE

(75) Inventors: Michael Welker, Waterloo (CA); Daniel Hanson, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 811 days.

(21) Appl. No.: 12/394,075

(22) Filed: Feb. 27, 2009

(65) Prior Publication Data

US 2010/0220887 A1 Sep. 2, 2010

(51) Int. Cl.
*H04R 25/00* (2006.01)

(52) U.S. Cl.
USPC .................. 381/388; 381/333; 381/386

(58) Field of Classification Search
USPC .......... 381/306, 333, 152, 337, 345, 349, 381/386, 388, 396, 431; 379/420.02, 430, 379/433.02, 432; 455/347, 350
See application file for complete search history.

(56) References Cited

U.S. PATENT DOCUMENTS

| | | | |
|---|---|---|---|
| 6,064,894 A | 5/2000 | Zurek et al. | |
| 6,427,017 B1 | 7/2002 | Toki | |
| 7,039,206 B2 | 5/2006 | Mellow | |
| 7,050,600 B2 * | 5/2006 | Saiki et al. | 381/388 |
| 7,120,264 B2 | 10/2006 | Saiki et al. | |
| 7,151,837 B2 | 12/2006 | Bank et al. | |
| 7,174,025 B2 | 2/2007 | Azima et al. | |
| 2001/0026625 A1 * | 10/2001 | Azima et al. | 381/152 |
| 2003/0086562 A1 | 5/2003 | Wong et al. | |
| 2006/0140437 A1 * | 6/2006 | Watanabe et al. | 381/431 |
| 2007/0202742 A1 * | 8/2007 | Honda et al. | 439/587 |

FOREIGN PATENT DOCUMENTS

| | | |
|---|---|---|
| EP | 1 603 308 A1 | 12/2005 |
| GB | 2 386 281 A | 9/2003 |
| WO | WO 02/080501 A1 | 10/2002 |
| WO | WO 2008/060026 A1 | 5/2008 |

OTHER PUBLICATIONS

European Search Report for EP 09154049.2, Jun. 29, 2009.

* cited by examiner

*Primary Examiner* — Huyen D Le
(74) *Attorney, Agent, or Firm* — McCarthy Tétrault LLP

(57) ABSTRACT

An enclosure for a magnetic speaker of a wireless device is provided. The wireless device has a display mounted in a case and a transparent cover mounted over at least the display. The enclosure comprises: an upper surface of the display at least partially spaced from a lower surface of the transparent cover to form at least a portion of an enclosed back-volume formed within the case for the magnetic speaker, the magnetic speaker being mounted proximate to the enclosed back-volume, and at least one of the transparent cover and the case having an opening formed therein for emitting sound from the magnetic speaker.

17 Claims, 8 Drawing Sheets

ENCLOSURE FOR A SPEAKER OF A WIRELESS DEVICE

FIELD OF THE APPLICATION

This application relates to the field of wireless devices, and more specifically, to an enclosure for a speaker of a wireless device.

BACKGROUND

Current wireless mobile communication devices include microprocessors, memory, soundcards, speakers, headphones, and run one or more software applications in addition to providing for voice communications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. Such wireless devices may operate on a cellular network, on a wireless local area network ("WLAN"), or on both of these types of networks.

One problem with current wireless devices pertains to speaker performance. Speakers in wireless devices require a back-volume to perform properly. The back-volume is a space, cavity, or volume typically located behind the speaker which is sized to allow unrestricted movement of the speaker's cone. If an adequate back-volume is not provided, the frequency response and efficiency of the speakers may be adversely affected by back pressure restricting movement of the speaker's cone. In general, providing a speaker with a back-volume by placing the speaker in an enclosure results in improved low frequency response and higher volume or loudness. Cavities associated with the wireless device's internal antenna or internal printed circuit boards may be used as a back-volume for the wireless device's speaker. However, using such cavities typically requires a complicated sealing geometry. In addition, such cavities may not be large enough to provide an adequate back-volume for the wireless device's speaker. As such, these cavities may have to be increased in volume by increasing the thickness of the wireless device thus increasing the overall size of the wireless device, which is not desirable.

A need therefore exists for an improved enclosure for a speaker of a wireless device. Accordingly, a solution that addresses, at least in part, the above and other shortcomings is desired.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the application. In some instances, certain software, circuits, structures and techniques have not been described or shown in detail in order not to obscure the application.

Figure 1:
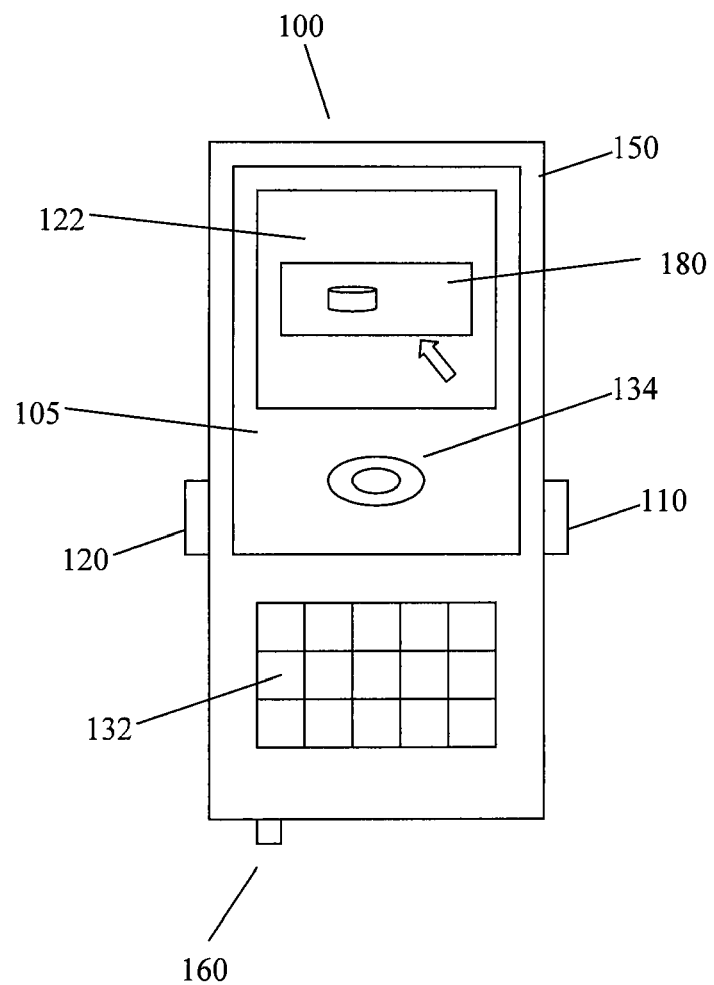
FIG. 1 is a front view illustrating a wireless device in accordance with an embodiment of the application.

FIG. 1 is a front view illustrating a wireless device 100 in accordance with an embodiment of the application. The wireless device 100 includes a case 150, a display (e.g., a liquid crystal display ("LCD")) 122, a graphical user interface ("GUI") 180 displayed on the display 122, a transparent cover (e.g., a lens) 105 mounted over the display 122 for protection thereof, a speaker 134, a keyboard (or keypad) 132, a thumbwheel (or trackwheel) 110, various select buttons 120, and various inputs/outputs (e.g., power connector jack, data interface ports, headphones jack, etc.) 160. Internally, the wireless device 100 typically includes one or more circuit boards (not shown in FIG. 1), a CPU 138, memory 124, 126, 200, a battery 156, an antenna (not shown in FIG. 1), etc., which are operatively coupled to the various inputs/outputs 160, the keyboard 132, the display 122, the speaker 134, etc., as will be described below.

Figure 2:
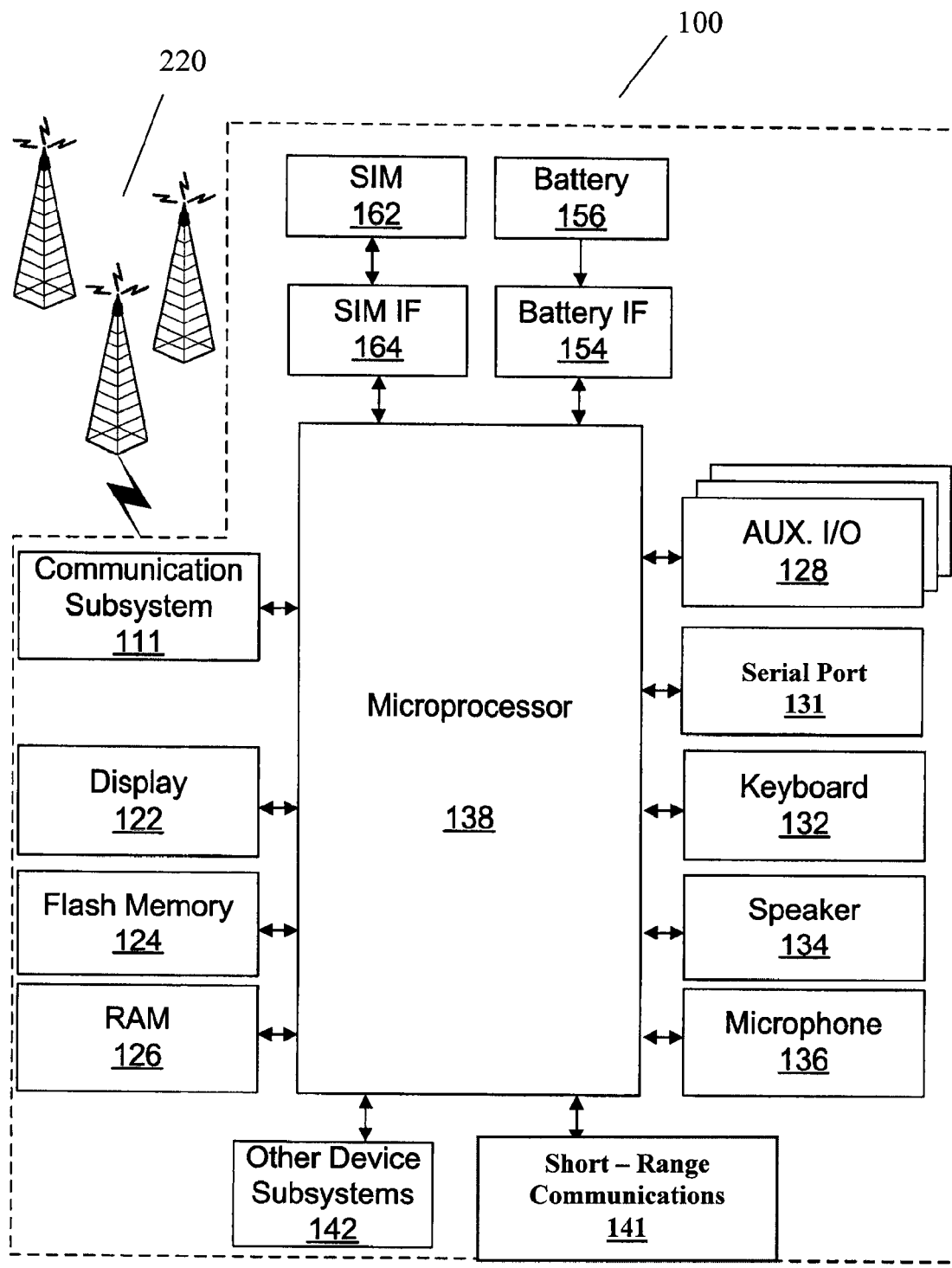
FIG. 2 is a block diagram illustrating the wireless device of FIG. 1.

FIG. 2 is a block diagram illustrating the wireless device 100 of FIG. 1. The wireless device 100 may operate over a wireless network 220. The wireless network 220 may include antenna, base stations, access points, transceivers, supporting radio equipment, etc., as known to those of ordinary skill in the art, for supporting wireless communications between the wireless device 100 and other devices (not shown).

The wireless device 100 may be a two-way communication device having at least voice and advanced data communication capabilities, including the capability to communicate with other devices. Depending on the functionality provided by the device 100, it may be referred to as a data messaging device, a two-way pager, a cellular telephone with data messaging capabilities, a wireless Internet appliance, a data communication device (with or without telephony capabilities), a Wi-Fi device, a WLAN device, a dual-mode (i.e., Wi-Fi and cellular) device, or a portable audio device. The device 100 may communicate with any one of a plurality of transceiver stations (not shown) within its geographic coverage area.

The wireless device 100 has a communication subsystem 111, which includes a RF receiver, a RF transmitter, and associated components, such as one or more antenna elements (e.g., embedded or internal), local oscillators ("LOs"), and a processing module such as a digital signal processor ("DSP") (all not shown).

The device 100 may be capable of cellular network access and hence the device 100 may have a subscriber identity module (or "SIM" card) 162 for inserting into a SIM interface ("IF") 164 in order to operate on the cellular network (e.g., a global system for mobile communication ("GSM") network).

The device 100 may be a battery-powered device and so it may also include a battery IF 154 for receiving one or more rechargeable batteries 156. The battery (or batteries) 156 provides electrical power to most if not all electrical circuitry in the device 100, and the battery IF 154 provides for a mechanical and electrical connection for it. The battery IF 154 is coupled to a regulator (not shown) which provides regulated power to the circuitry of the device 100.

The wireless device 100 includes a microprocessor 138 which controls overall operation of the device 100. Communication functions, including at least data and voice communications, are performed through the communication subsystem 111. The microprocessor 138 also interacts with additional device subsystems such as the display 122, a flash memory 124 or other persistent store, a random access memory ("RAM") 126, auxiliary input/output ("I/O") subsystems 128, a serial port (e.g., a universal serial bus ("USB") port) 131, the keyboard 132, the clickable thumbwheel 110, the speaker 134, a microphone 136, a short-range communications subsystem 141, and other device subsystems 142.

The microprocessor 138, in addition to its operating system functions, preferably enables execution of software applications on the device 100. A predetermined set of applications which control basic device operations, including at least data and voice communication applications, will normally be installed on the device 100 during its manufacture. A preferred application that may be loaded onto the device 100 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 100 and SIM 162 to facilitate storage of PIM data items and other information.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 100 may also compose data items, such as email messages, for example, using the keyboard 132 in conjunction with the display 122, and possibly the auxiliary I/O device 128. The keyboard 132 is preferably a complete alphanumeric keyboard and/or a telephone-type keypad. These composed items may be transmitted over a communication network 220 through the communication subsystem 111 or the short range communication subsystem 141.

For voice communications, the overall operation of the wireless device 100 is substantially similar, except that the received signals would be output to the speaker 134 and signals for transmission would be generated by the microphone 136. Alternative voice or audio I/O subsystems, such as a voice message recording subsystem, may also be implemented on the device 100. Although voice or audio signal output is preferably accomplished primarily through the speaker 134, the display 122 may also be used to provide, for example, an indication of the identity of a calling party, duration of a voice call, or other voice call related information.

Figure 3:
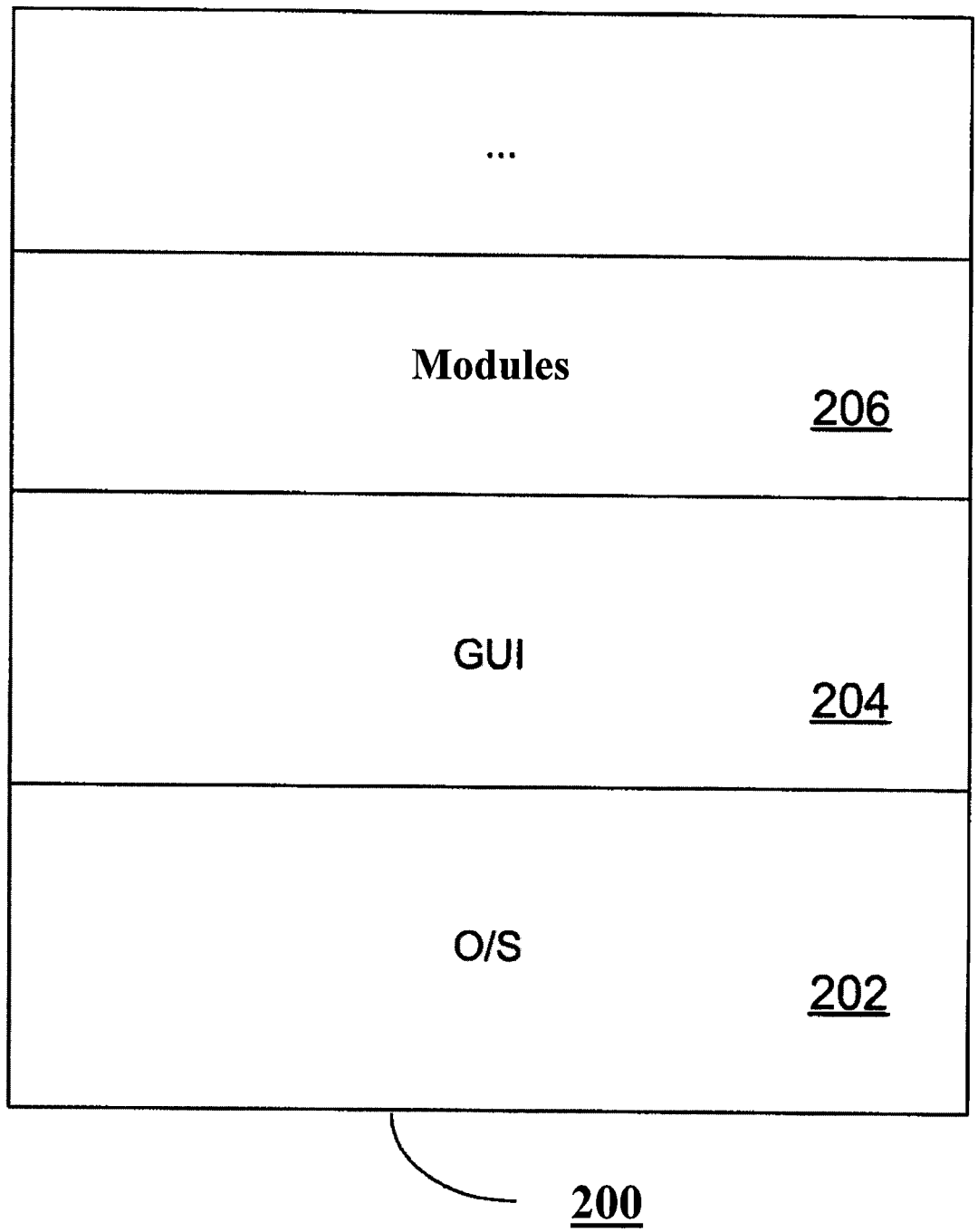
FIG. 3 is a block diagram illustrating a memory of the wireless device of FIG. 1.

FIG. 3 is a block diagram illustrating a memory 200 of the wireless device 100 of FIG. 1. The microprocessor 138 is coupled to the memory 200. The memory 200 has various hardware and software components for storing information (e.g., instructions, data, database tables, test parameters, etc.) for enabling operation of the device 100 and may include flash memory 124, RAM 126, ROM (not shown), disk drives (not shown), etc. In general, the memory 200 may include a variety of storage devices typically arranged in a hierarchy of storage as understood to those skilled in the art.

According to one embodiment, the wireless device 100 may be a multi-tasking wireless communications device configured for sending and receiving data items and for making and receiving voice calls. In addition, the microprocessor 138 of the wireless device 100 is typically coupled to one or more devices or subsystems (e.g., 110, 120, 132) for receiving user commands or queries and for displaying the results of these commands or queries to the user on the display 122. To provide a user-friendly environment to control the operation of the device 100, operating system ("O/S") software modules 202 resident on the device 100 provide a basic set of operations for supporting various applications typically operable through the GUI 180 and supporting GUI software modules 204. For example, the O/S 202 provides basic input/output system features to obtain input from the auxiliary I/O 128, the keyboard 132, the clickable thumbwheel 110, and the like, and for facilitating output to the user through the display 122, the speaker 134, etc. Though not shown, one or more applications for managing communications or for providing personal digital assistant like functions may also be included. According to one embodiment, the wireless device 100 is provided with hardware and/or software modules 206 for facilitating and implementing various additional functions. According to one embodiment, a user may interact with the wireless device 100 and its various software modules 202, 204, 206, using the GUI 180.

The present application provides an enclosure for the speaker 134 that allows the wireless device 100 to maintain its thickness while using a cavity that is not used for anything else in the wireless device 100. In addition, there is no need for separate sealing of this cavity as dust sealing of this cavity is already provided.

Figure 4:
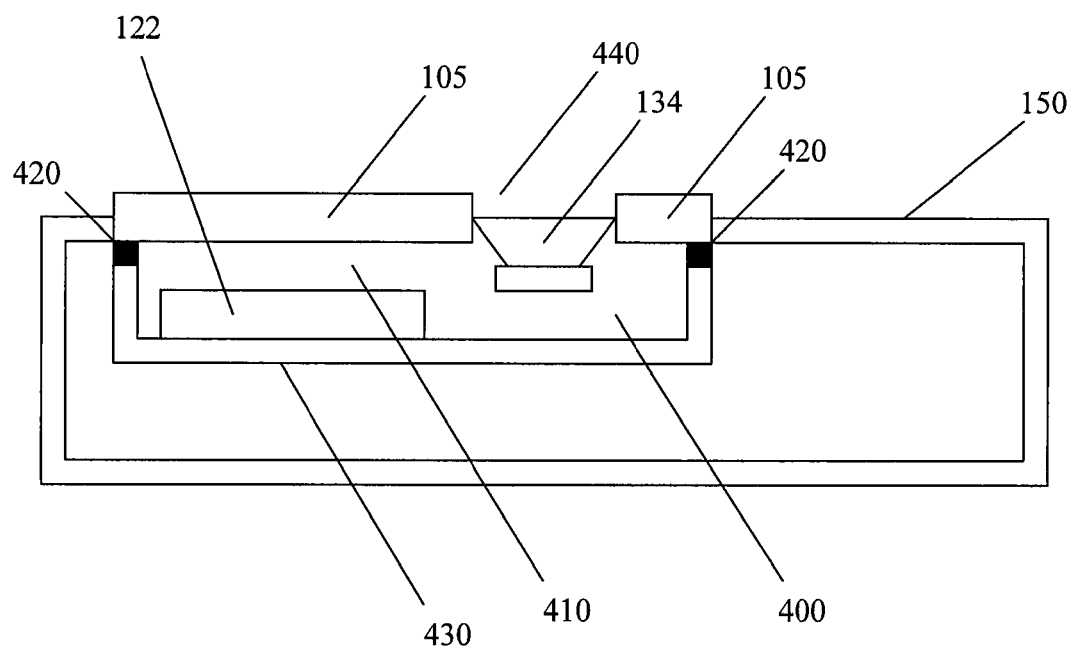
FIG. 4 is a simplified longitudinal section view illustrating an enclosure for a speaker of the wireless device of FIG. 1.

FIG. 4 is a simplified longitudinal section view illustrating an enclosure 400 for a speaker 134 of the wireless device 100 of FIG. 1. The enclosure 400 provides a back-volume 410 or cavity for the speaker 134 of the wireless device 100. According to one embodiment, the enclosure 400 is formed by the lower surface of the transparent cover 105, also called a lens, the upper surface of the display 122, and sealing material 420 that forms or completes the walls of the enclosure 400. The lens 105 is spaced apart from the display 122 by the sealing material 420 to form the back-volume 410 therebetween. Portions of the enclosure 400 may be formed by various supports 430 for the display 122 and/or speaker 132 (e.g., printed circuit boards, spacers, baffles, etc.) and by various portions of the case 150 depending on the geometry of the display 122, transparent cover 105, speaker 134, and case 150. For example, depending on the geometry of the components used, the speaker 134 may form or complete a wall of the enclosure 400.

According to one embodiment, the sealing material 420 may include dust sealing material that is typically used to seal the perimeter of the display 122 and transparent cover 105 to prevent dust from entering therebetween. In addition, the sealing material 420 may include acoustic sealing material to improve the performance of the back-volume 410. Of course, the material chosen for the sealing material 420 may include both appropriate dust sealing and acoustic sealing properties. According to one embodiment, the sealing material 420 may be silicon or a thermoplastic elastomer ("TPE").

The speaker 134 is mounted proximate to the back-volume 410, and may become part of the enclosure 400. In FIGS. 1 and 4, the speaker 134 is shown as being mounted behind the transparent cover 105 for projecting sound through an appropriate opening or openings 440 in the transparent cover 105. However, according to another embodiment, the speaker 134 may be mounted in the case 150 proximate to the back-volume 410 (see FIGS. 7-9).

According to one embodiment, the speaker 134 is a magnetic type loudspeaker (i.e., having a magnet, cone, frame, etc.). According to one embodiment, the wireless device 100 has two or more speakers 134.

Figure 5:
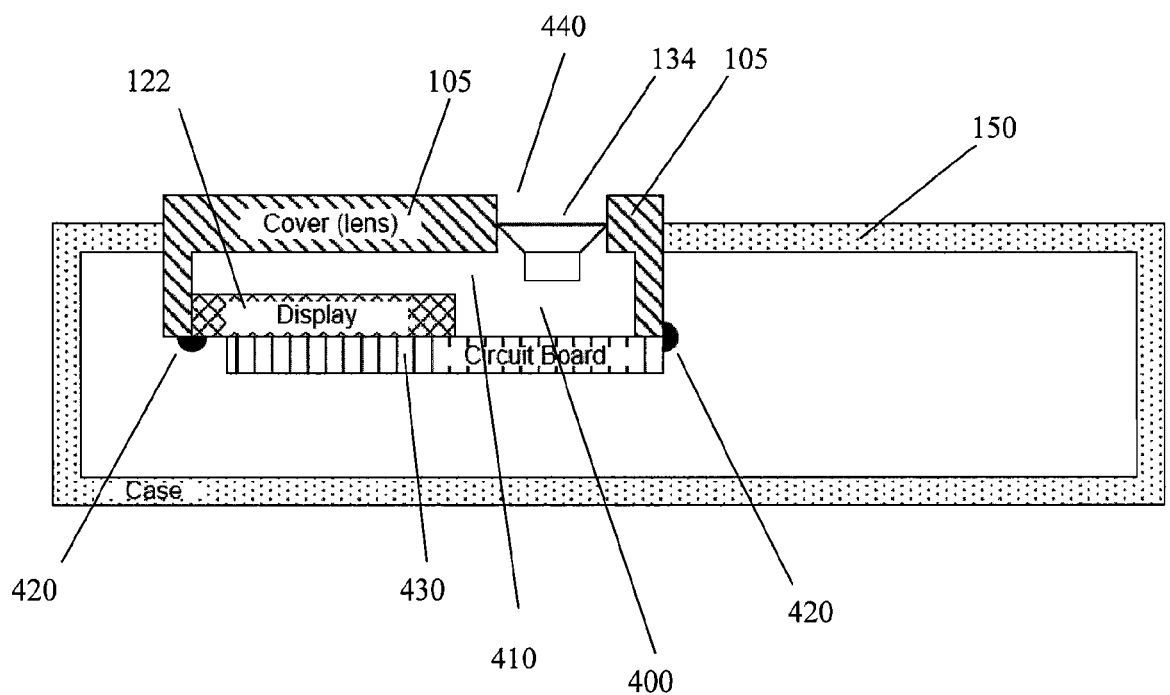
FIG. 5 is a simplified longitudinal section view illustrating an enclosure for a speaker of a wireless device in accordance with an alternate embodiment.

FIG. 5 is a simplified longitudinal section view illustrating an enclosure 400 for a speaker 134 of a wireless device 100 in accordance with an alternate embodiment. In FIG. 5, the transparent cover 105 is L-shaped having one end proximate to one end of the display 122. In this embodiment, the sealing material 420 does not necessarily form a significant portion of the enclosure 400.

Figure 6:
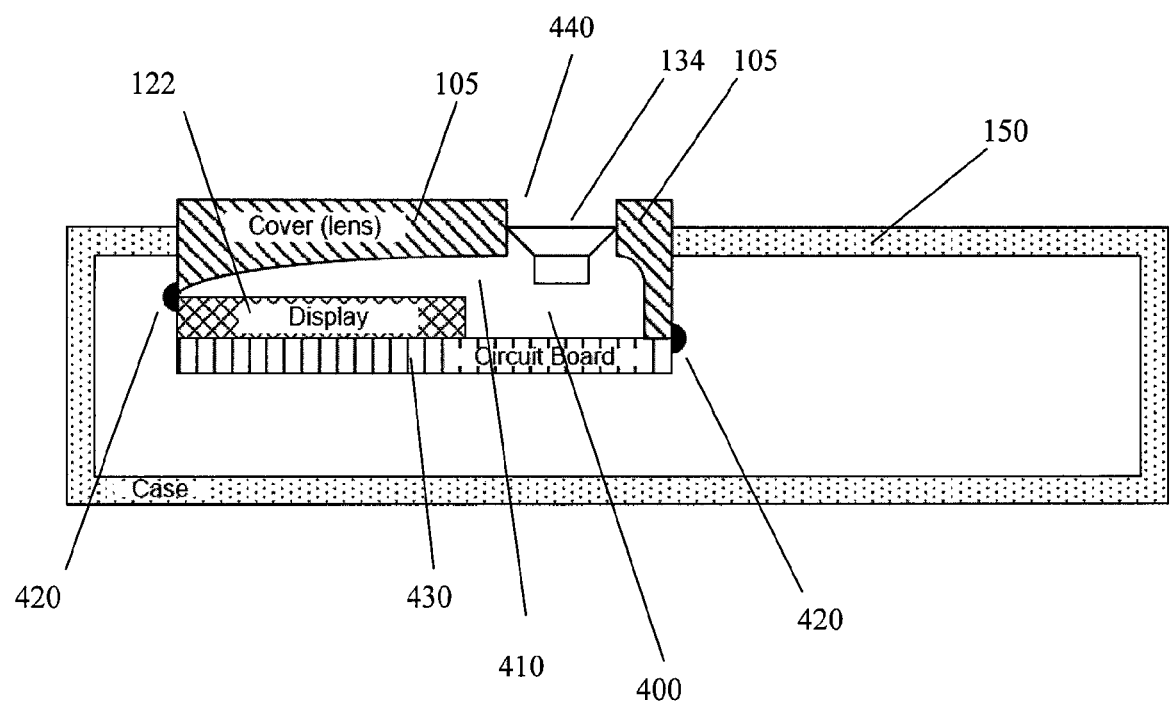
FIG. 6 is a simplified longitudinal section view illustrating an enclosure for a speaker of a wireless device in accordance with an alternate embodiment.

FIG. 6 is a simplified longitudinal section view illustrating an enclosure 400 for a speaker 134 of a wireless device 100 in accordance with an alternate embodiment. In FIG. 6, the transparent cover 105 is tapered at one end proximate to one end of the display 122. In this embodiment, the sealing material 420 does not necessarily form a significant portion of the enclosure 400.

Figure 7:
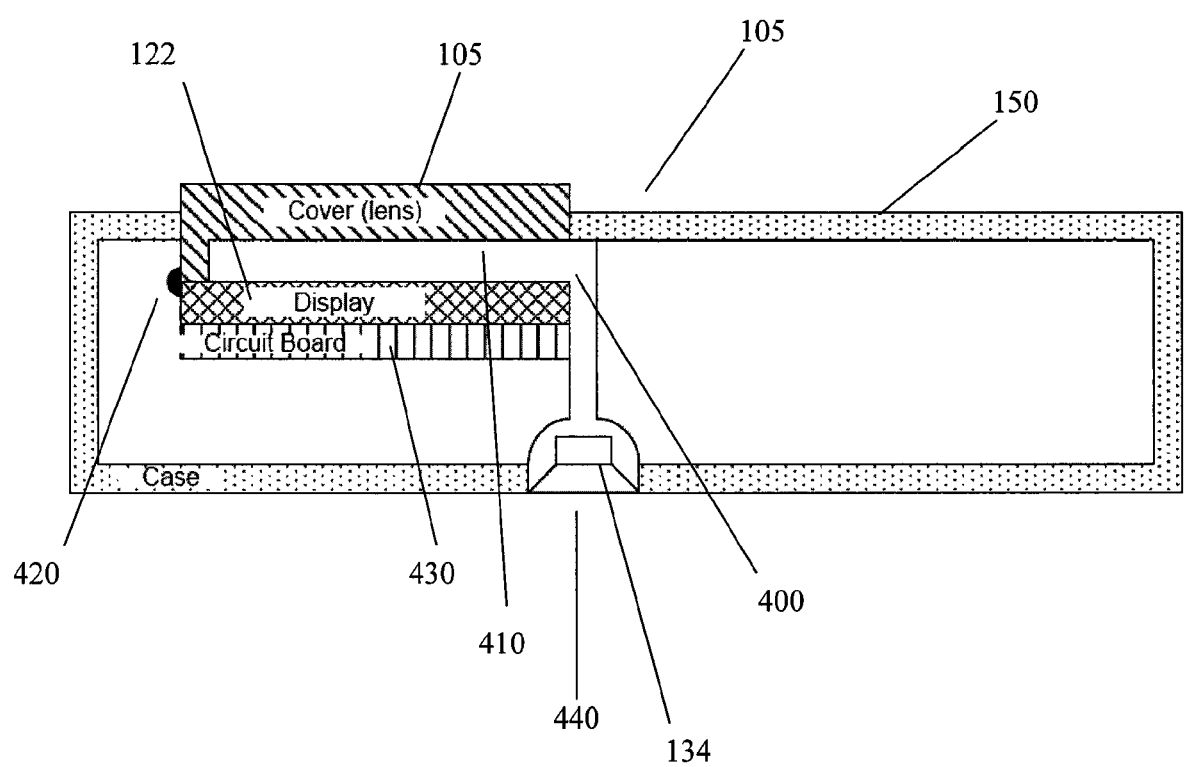
FIG. 7 is a simplified longitudinal section view illustrating an enclosure for a speaker of a wireless device in accordance with an alternate embodiment; and, FIG. 8 is a simplified longitudinal section view illustrating an enclosure for a speaker of a wireless device in accordance with an alternate embodiment.

FIG. 7 is a simplified longitudinal section view illustrating an enclosure 400 for a speaker 134 of a wireless device 100 in accordance with an alternate embodiment. In FIG. 7, the transparent cover 105 is L-shaped having one end proximate to one end of the display 122. In this embodiment, the sealing material 420 does necessarily not form a significant portion of the enclosure 400. In this embodiment, the speaker 134 is mounted on the back of the case 150 to which the back-volume 410 extends.

Figure 8:
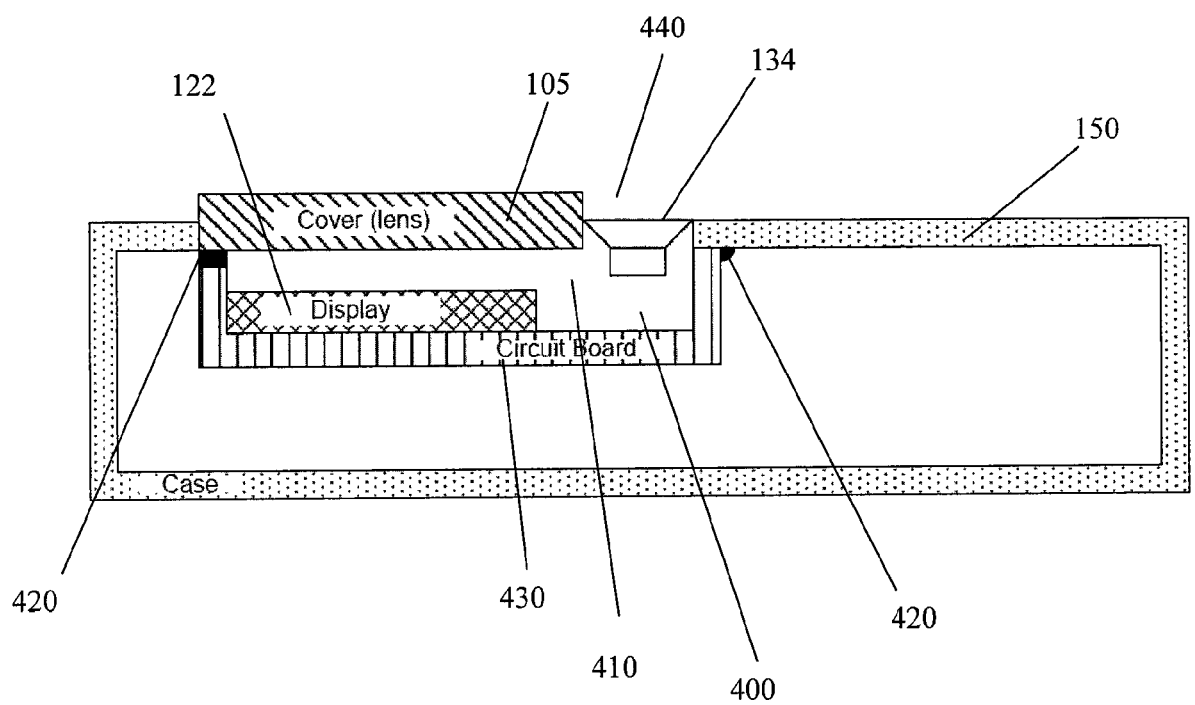

FIG. 8 is a simplified longitudinal section view illustrating an enclosure 400 for a speaker 134 of a wireless device 100 in accordance with an alternate embodiment. In FIG. 8, the support 430 is C-shaped having one end proximate to the case 150. In this embodiment, the sealing material 430 between the transparent cover 105 and the support 430 forms a portion of the enclosure 400 but the sealing material 430 between the support 430 and the case 150 does not necessarily form a significant portion of the enclosure 400. In this embodiment, an opening or openings 440 for the speaker 134 is provided in the case 150 rather than in the transparent cover 105.

The above embodiments may provide one or more advantages. First, no additional volume within the wireless device 100 is required. Second, the thickness or overall size of the wireless device 100 does not have to be increased to accommodate the back-volume 410. Third, no additional sealing pats are necessary, thus reducing costs. Fourth, the enclosure 400 provides a back-volume 410 that is large enough to provide good speaker performance.

The embodiments of the application described above are intended to be exemplary only. Those skilled in this art will understand that various modifications of detail may be made to these embodiments, all of which come within the scope of the application.

What is claimed is:

1. An enclosure for a magnetic speaker and a display of a wireless device, the enclosure located in a case of the wireless device and comprising:
   a support for mounting the display, the support forming a part of an enclosed back-volume for the magnetic speaker and forming a first opening above the display; and
   a transparent cover mounted in the first opening to complete a wall of the enclosure, the transparent cover having a lower surface forming at least a portion of the enclosed back-volume and a second opening through its outer surface to receive the magnetic speaker,
   wherein the magnetic speaker is mounted to the transparent cover in the second opening.

2. The enclosure of claim 1 wherein a portion of the case defines the enclosed back-volume.

3. The enclosure of claim 1 wherein the support is a portion of the case.

4. The enclosure of claim 1 wherein the support is a printed circuit board.

5. The enclosure of claim 1 wherein a portion of sealing material defines the enclosed back-volume.

6. The enclosure of claim 5 wherein the portion of sealing material is located proximate the lower surface of the transparent cover.

7. The enclosure of claim 6 wherein the sealing material is at least one of dust sealing and acoustic sealing material.

8. The enclosure of claim 1 wherein the magnetic speaker is mounted under the transparent cover and emits sound through the second opening.

9. The enclosure of claim 1 wherein:
   the support is a printed circuit board (PCB); and
   the display is mounted to the PCB.

10. A system for housing a magnetic speaker and a display for a wireless device, the system comprising:
    a case for enclosing the magnetic speaker and the display, the case having a first opening located above the display;
    a support for mounting the display within the case, the support forming part of an enclosed back-volume for the magnetic speaker;
    a transparent cover mounted over display in the first opening of the case, the transparent cover having a lower surface forming at least a portion of the enclosed back-volume and a second opening through its outer surface to receive the magnetic speaker,
    wherein
    the magnetic speaker is mounted adjacent to the transparent cover in the second opening; and
    a portion of the case defines the enclosed back-volume.

11. The system for housing a magnetic speaker and a display for a wireless device as claimed in claim 10 wherein:
    the support is a printed circuit board (PCB).

12. The system for housing a magnetic speaker and a display for a wireless device as claimed in claim 11 wherein:
    the display is mounted to the PCB.

13. The system for housing a magnetic speaker and a display for a wireless device as claimed in claim 10 wherein:
    the transparent cover is L-shaped having a top section that extends inwardly to the interior of the case; and
    a top section of the display is adjacent to the case forming another part of the enclosed back volume.

14. The system for housing a magnetic speaker and a display for a wireless device as claimed in claim 13 further comprising:
    sealing material located proximate the lower surface of the transparent cover, sealing a part of the transparent cover to the display.

15. The system for housing a magnetic speaker and a display for a wireless device as claimed in claim 13 wherein:
    the display is mounted on a printed circuit board (PCB) to extend past a top edge of the PCB.

16. The system for housing a magnetic speaker and a display for a wireless device as claimed in claim 10 wherein:
    the transparent cover is tapered having a top section that extends inwardly to the interior of the case; and
    a top section of the display is adjacent to the case forming another part of the enclosed back volume.

17. The system for housing a magnetic speaker and a display for a wireless device as claimed in claim 16 further comprising:

sealing material located proximate the lower surface of the transparent cover, sealing a part of the transparent cover to the display.

\* \* \* \* \*